(12) United States Patent  (10) Patent No.: US 7,603,915 B2
Spivak et al. (45) Date of Patent: Oct. 20, 2009

(54) FORCE BALANCED IMPELLER FLOW METER FOR MASS FLOW RATE CONTROL

(75) Inventors: Alexander Spivak, Eden Prairie, MN (US); Odd Harald Steen Eriksen, Minneapolis, MN (US); Felix Goldenberg, Sunrise, FL (US); Alexander Grichener, Plymouth, MN (US); Christopher Sanden, Eden Prairie, MN (US); Joe Mctighe, Burnsville, MN (US); Chuang-Chia Lin, Lakeville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 143 days.

(21) Appl. No.: 11/895,196

(22) Filed: Aug. 23, 2007

(65) Prior Publication Data

US 2009/0049927 A1 Feb. 26, 2009

(51) Int. Cl.
*G01F 1/80* (2006.01)
(52) U.S. Cl. ................................. 73/861.352
(58) Field of Classification Search ............. 73/861.79, 73/861.94, 861.03; 702/46; 324/660
See application file for complete search history.

(56) References Cited

U.S. PATENT DOCUMENTS

| | | | |
|---|---|---|---|
| 4,404,638 A * | 9/1983 | Yada et al. ............. | 702/46 |
| 5,939,645 A * | 8/1999 | Kellerman ............. | 73/861.94 |
| 6,601,461 B2 * | 8/2003 | Maxit et al. ............. | 73/861.79 |
| 6,774,642 B2 * | 8/2004 | Lin et al. ................. | 324/660 |
| 7,396,327 B2 * | 7/2008 | Morello .................... | 600/17 |

FOREIGN PATENT DOCUMENTS

JP   02002284422 A  *  3/2001

* cited by examiner

*Primary Examiner*—Jewel Thompson
(74) *Attorney, Agent, or Firm*—Scott D. Wofsy; Edwards Angell Palmer & Dodge LLP

(57) ABSTRACT

A force balanced mass flow meter is disclosed that includes a cylindrical sensor housing having an interior bore, an impeller body supported for axial rotation within the interior bore of the sensor housing, and including structure for converting fluid inertia into flow induced torque when fluid flows relative to the impeller body, a proximity sensor for measuring a rotation angle of the impeller body relative to the sensor housing, an electromagnet for generating a magnetic field about the sensor housing to prevent rotation of the impeller body, electronics for determining electrical values from the proximity sensor when fluid flows relative to the impeller body and a controller for controlling current supplied to the electromagnet in response to electrical values determined from the proximity sensor, to generate a magnetic field sufficient to prevent impeller rotation.

34 Claims, 13 Drawing Sheets

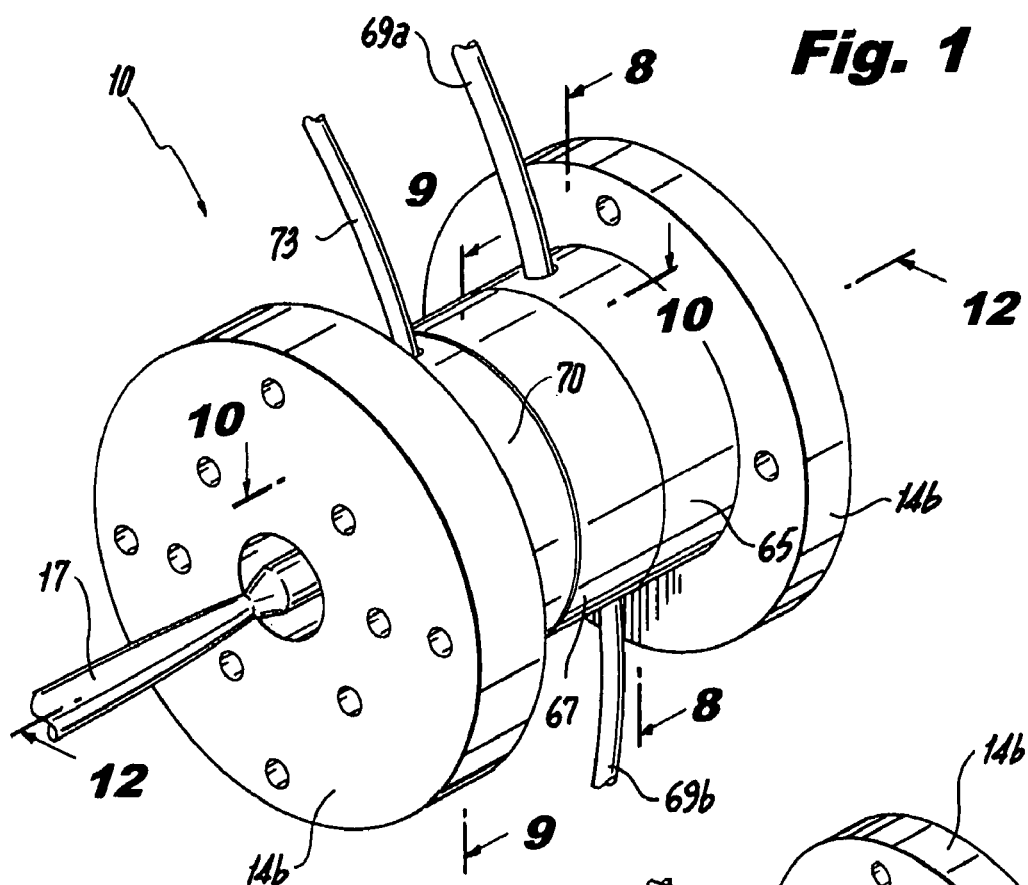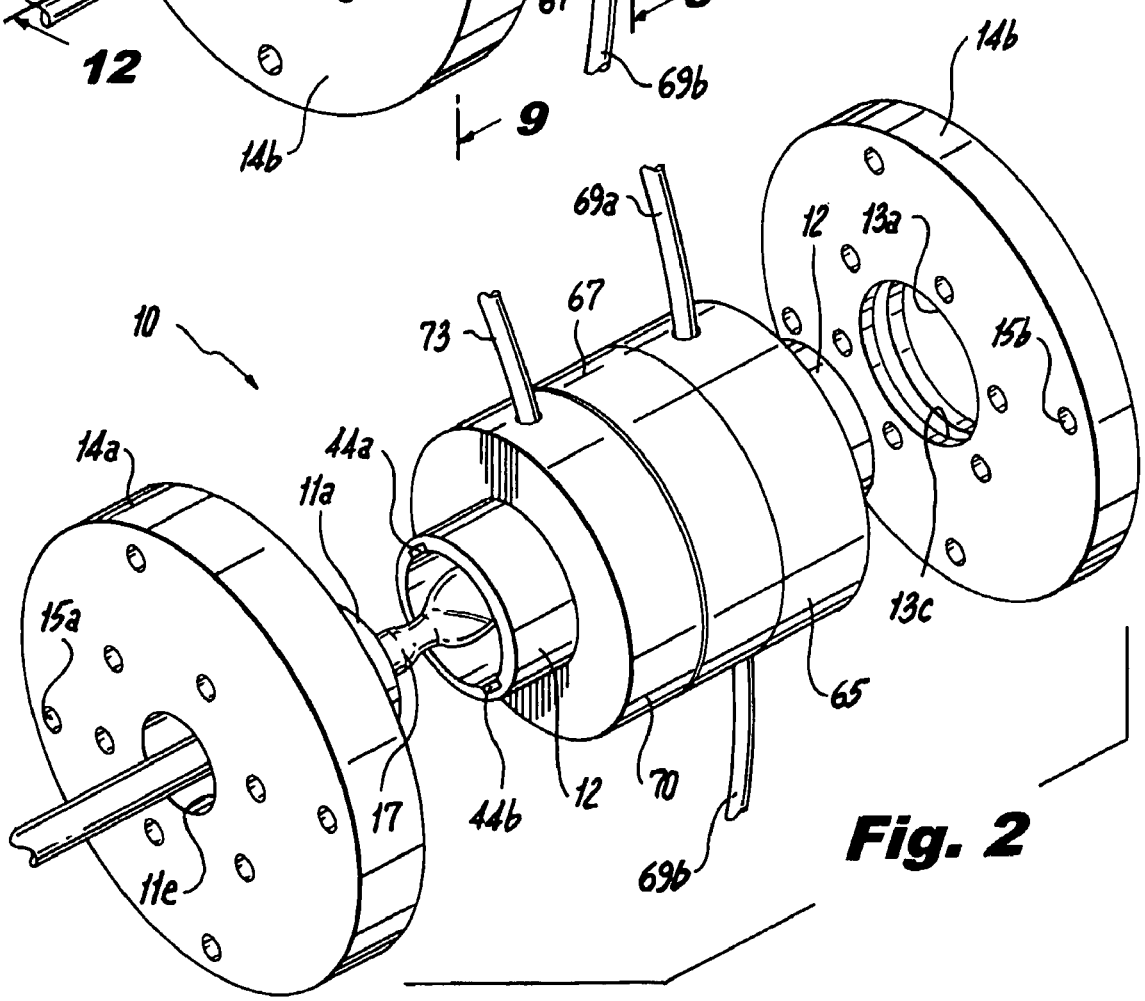

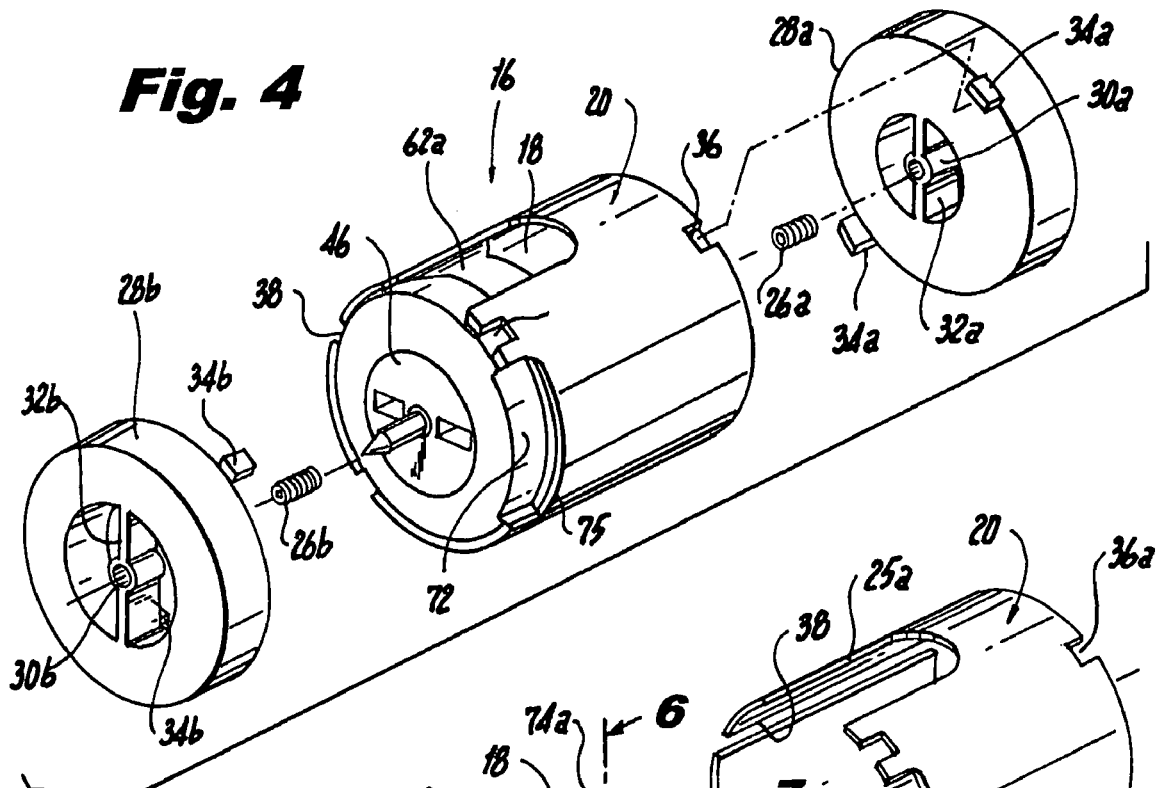
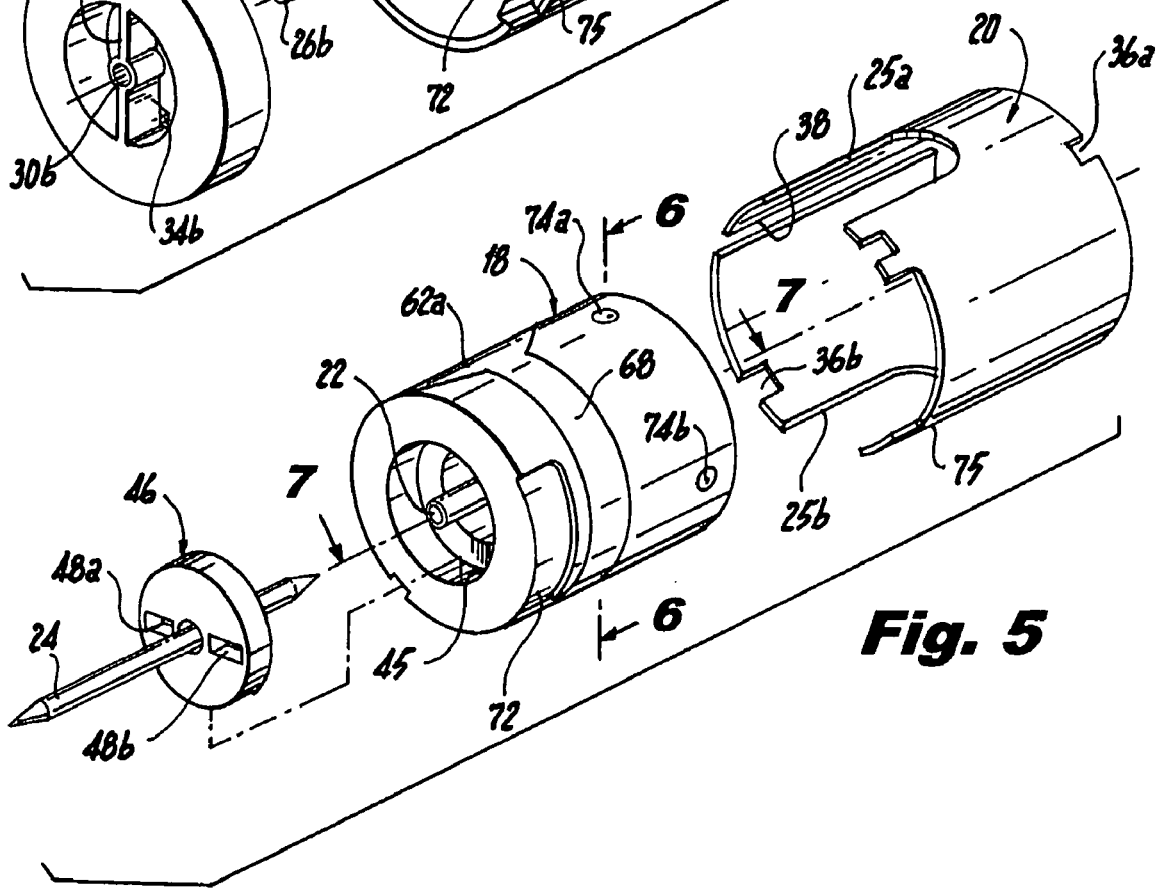

FORCE BALANCED IMPELLER FLOW METER FOR MASS FLOW RATE CONTROL

BACKGROUND OF THE INVENTION

1. Field of the Invention

The subject invention is directed to a mass flow meter for characterizing the mass flow rate of a fluid, and more particularly, to a force balanced impeller flow meter for mass flow rate control of a fuel in a gas turbine engine.

2. Description of Related Art

The next generation of gas turbine engines will likely include distributed flow architecture, wherein fuel flow to individual injector nozzles will be selectively modulated by an active fuel delivery control system. Distributed control architecture requires individual mass flow rate control at each nozzle. This will require smaller mass flow sensors with faster response times that can operate at relatively small flow rates. The estimated flow rates are expected to be about an order of magnitude less than those of conventional main flow stream meters.

A well known prior art main flow stream meter for accurately measuring fuel flow rates in gas turbine engines is disclosed in U.S. Pat. No. 6,776,055. This device is in the form of an angular momentum flow meter that includes a spinning impeller mounted within a rotatable drum. In order to operate, the impeller requires a certain amount of mass fuel flow to overcome frictional effects of bearings and fluid viscosity. The device is therefore inadequate for applications that involve small fuel flow rates, such as the flow rates expected in distributed control applications.

It would be beneficial therefore, to provide a mass flow meter that is adapted and configured to provide accurate mass flow rate measurements for small flow rate applications.

SUMMARY OF THE INVENTION

The subject application is directed to a new and useful mass flow meter for characterizing the mass flow rate of a fluid, which is well adapted to provide accurate mass flow rate measurements for small flow rate applications, such as, for example, a distributed control architecture for an active fuel delivery control system. The mass flow meter includes a cylindrical sensor housing having an interior bore and an impeller body supported for axial rotation within the interior bore of the sensor housing. The impeller body includes means for converting fluid moment of momentum, also referred to herein as fluid inertia, into solid body rotation or torque when fluid flows relative to the impeller body.

The mass flow meter of the subject invention further includes sensing means in the form of a proximity sensor for measuring a rotation angle of the impeller body relative to the sensor housing, and electromagnetic means for generating a magnetic field about the sensor housing to prevent rotation of the impeller body. In addition, the mass flow meter includes means for determining electrical values from the sensing means when fluid flows relative to the impeller body, and means for controlling electricity supplied to the electromagnetic means in response to electrical values from the sensing means, to generate a magnetic field sufficient to prevent the impeller body from rotating.

Preferably, the means for converting fluid inertia into solid body rotation or torque includes a fluid flow path extending through the impeller body. The fluid flow path includes a spin chamber, which communicates with a turbine plate having shaped turbine outlet channels. The turbine outlet channels are adapted and configured to generate flow-induced torque.

The mass flow meter further includes an elongated flow swirler that communicates with an inlet end of the fluid flow path through the impeller body. The flow swirler is configured to impart a helical flow pattern about the axis of flow to fluid passing therethrough, which increases the angular velocity of the fluid about the axis of flow. This enhances the flow induced torque exerted on the impeller body, and is advantageous given the relatively low flow rate of the fluid delivered to the impeller body. Preferably, the flow swirler comprises a thin-walled pipe having an elliptical cross-section, helically twisted about its longitudinal axis. Alternatively, the flow swirler may comprise a tube having a helical insert therein for imparting a helical flow to fluid passing therethrough or a pair of entwined tubes.

The impeller body of the mass flow meter is supported for axial rotation about an elongated shaft. The shaft is supported by axially opposed low-friction bearings. These bearings may be in the form of jewel bearings, ball bearings or the like. In either instance, the axially opposed bearings are retained by resilient support members coupled to the interior bore of the sensor housing. Preferably, the bearings are threadably retained by the resilient supports and can be adjusted to vary the axial load on the shaft.

In accordance with a preferred embodiment of the subject invention, the sensing means or proximity sensor comprises a capacitive angular position sensor. In one instance, the capacitive angular position sensor includes two diametrically opposed conductive regions provided on an exterior surface of the impeller body and two corresponding pairs of diametrically opposed electrodes associated with an interior surface of the sensor housing. Each electrode pair is positioned to electrically interact with a corresponding conductive region to develop an associated capacitance value depending upon the amount of overlapping or coincident surface area existing therebetween at any given time during operation.

In another instance, the capacitive angular position sensor includes a helical conductive region provided on an exterior surface of the impeller body and a helical electrode associated with an interior surface of the sensor housing. Interaction between the stationary electrode helix and the floating helical conductive region develops associated capacitance values depending upon the amount of overlapping or coincident surface area that exists therebetween at any given time during operation.

The electromagnetic means for generating a magnetic field to prevent rotation of the impeller body preferably includes a plurality of permanent magnets positioned in the impeller body about a circumference thereof, and a stator coil surrounding the sensor housing and impeller body in alignment with the permanent magnets. The means for determining electrical values from the sensing means preferably comprises capacitance pick-off electronics, and the means for controlling the electricity supplied to the stator coil of the electromagnetic means preferably comprises a proportional-integral-derivative controller for controlling current supply, which is connected to a power amplifier.

In accordance with the subject invention, the current supplied to the stator coil of the electromagnetic means by the proportional-integral-derivative controller to prevent flow induced rotation of the impeller body or to otherwise maintain the impeller body in a magnetically balanced position, is proportional to the measured flow induced torque applied to the impeller body. Therefore, the output of the capacitive angular position sensor of the mass flow meter of the subject invention is proportional to the offset caused by the deviation of the impeller body from the zero position, exciting a change in the current delivered to the stator coil, which corrects to the original zero position of the impeller body.

These and other features and benefits of the subject invention and the manner in which it is assembled and employed will become more readily apparent to those having ordinary skill in the art from the following enabling description of the preferred embodiments of the subject invention taken in conjunction with the several drawings described below.

BRIEF DESCRIPTION OF THE DRAWINGS

So that those skilled in the art to which the subject invention appertains will readily understand how to make and use the subject invention without undue experimentation, preferred embodiments thereof will be described in detail hereinbelow with reference to certain figures, wherein:

FIG. 1 is a perspective view of the mass flow meter of the subject invention, shown with a flow swirler for imparting a helical flow to fluid entering the device;

FIG. 2 is a perspective view of the mass flow meter shown in FIG. 1, with the axially opposed mounting flanges associated therewith removed for ease of illustration;

FIG. 4 is a perspective view of the impeller assembly of the mass flow meter of FIG. 1, as viewed from the outlet end, with the axially opposed supports separated from the spacer sleeve for ease of illustration;

FIG. 5 is an exploded perspective view of the impeller assembly of the mass flow meter of FIG. 1, as viewed from the outlet end, with the impeller body removed from the spacer sleeve, and the turbine plate removed from the impeller body for ease of illustration;

DETAILED DESCRIPTION OF PREFERRED EMBODIMENTS

Figure 3:
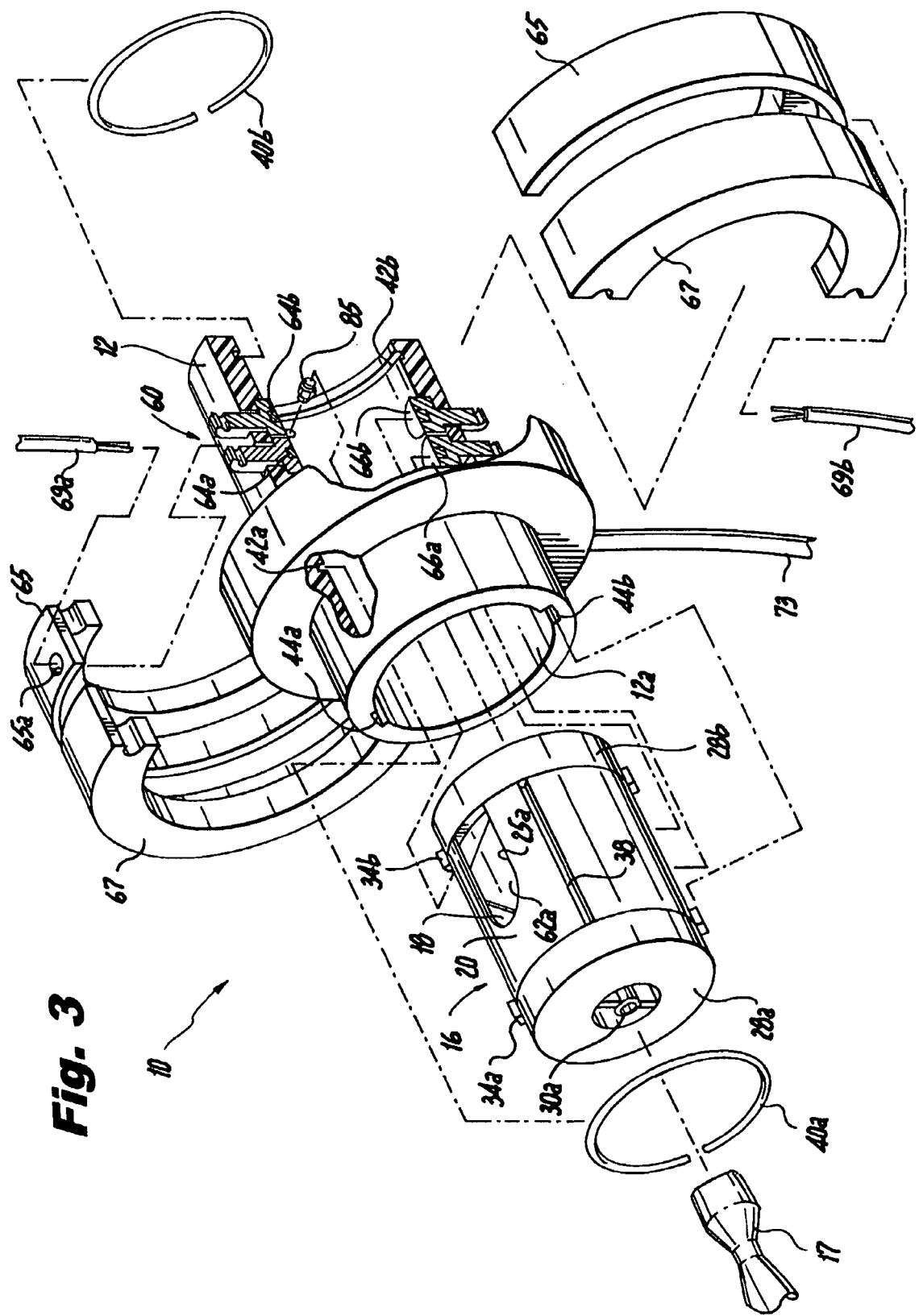
FIG. 3 is an exploded perspective view of the mass flow meter of FIG. 1, as viewed from the inlet end, with the impeller assembly separated from the sensor housing for ease of illustration, and wherein the sensor housing is shown in partial cross-section to illustrate the paired stationary electrodes associated therewith.

Referring now to the drawings wherein like reference numerals identify or otherwise refer to similar structural features or elements of the various embodiments of the subject invention, there is illustrated in FIG. 1 a force balanced mass flow meter constructed in accordance with a preferred embodiment of the subject invention and designated generally by reference numeral 10. The mass flow meter 10 of the subject invention is essentially an electro-mechanical transducer for computing mass flow rate or fluid density (e.g., mass fuel flow rate or fuel density). The device is designed to respond accurately with respect to relatively small flow rates and is particularly well adapted for use in conjunction with the distributed control architecture of an active combustion control system for a gas turbine engine. An active combustion control system in disclosed for example in U.S. patent application Ser. No. 11/601,301, the disclosure of which is herein incorporated by reference in its entirety.

Referring to FIGS. 1 and 2, the mass flow meter 10 of the subject invention includes a cylindrical sensor housing 12 bounded by opposed mounting flanges 14a, 14b. Mounting flanges 14a, 14b are each provided with a plurality of circumferentially arranged bolt holes 15a, 15b for accommodating mounting bolts or the like (not shown). The mounting bolts enable the mass flow meter 10 to be installed in a fluid supply line, such as, for example, a fuel supply conduit communicating with a fuel injector of a gas turbine engine. Those skilled in the art should readily appreciate that sensor housing 12 could be mounted by means other than mounting flanges 14a, 14b, depending upon the system in which sensor housing 12 is installed.

To facilitate the assembly of mounting flanges 14a, 14b with sensor housing 12 in a fluid tight manner, flange 14a includes a central body portion 11a that extends into sensor housing 12. In addition, an annular recess 11b (see FIG. 10) is formed in the inner face of flange 14a for receiving the inlet end portion of sensor housing 12. An annular channel 11c surrounds recess 11b for accommodating an O-ring seal 11d or the like (see FIG. 10). Similarly, a shown in FIG. 2, a stepped central bore 13a is formed in mounting flange 14b for receiving the outlet end portion of sensor housing 12. An annular channel 13c surrounds bore 13a for accommodating an O-ring seal 13d or the like (see FIG. 10).

Figure 10:
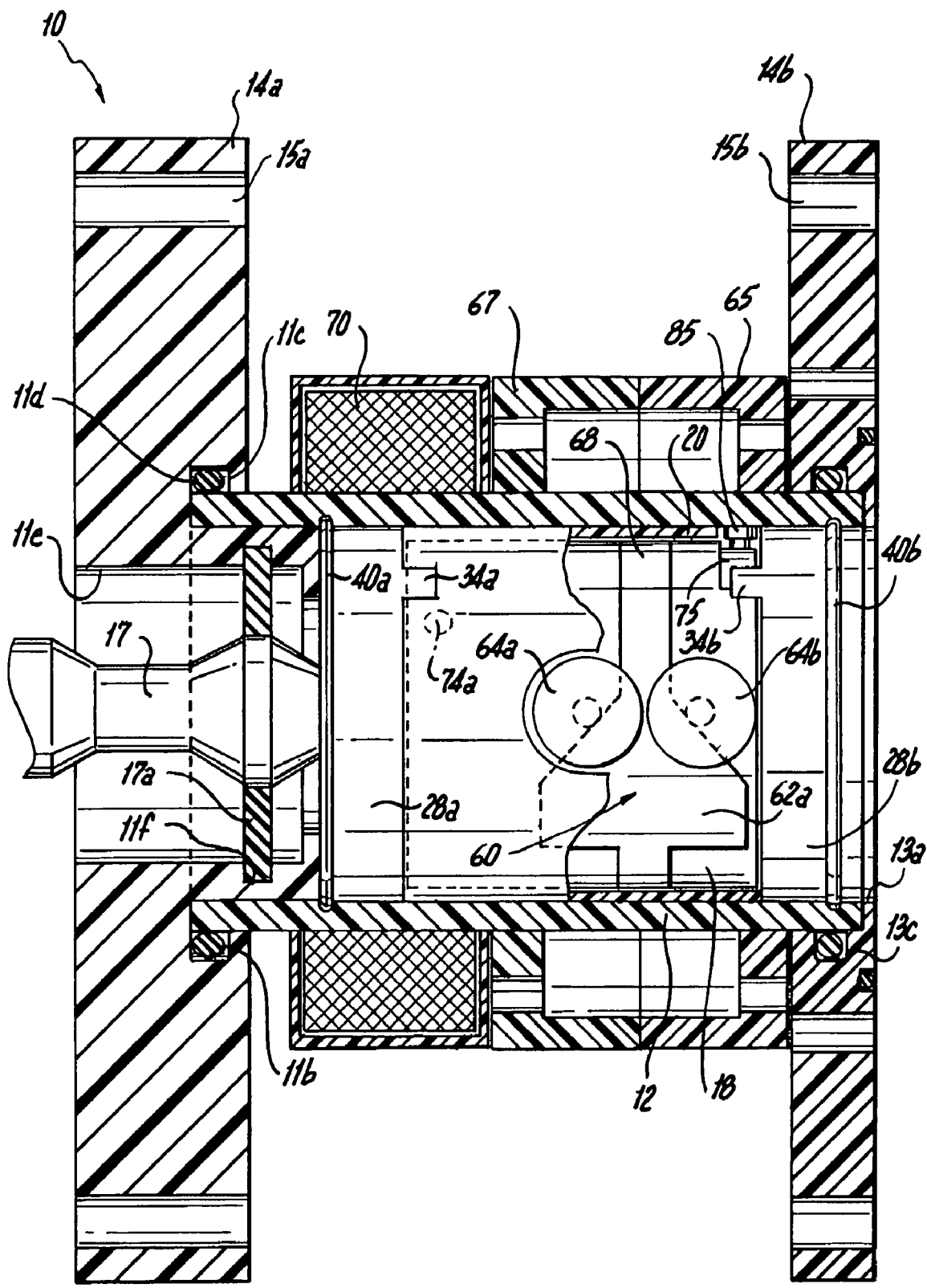
FIG. 10 is a side elevational view of the mass flow meter of the subject invention taken along line 10-10 of FIG. 1, with the wall of the spacer sleeve sectioned to illustrate the impeller body mounted for rotation therein, in a magnetically balanced position, wherein the diametrically opposed conductive regions on the impeller body partially overlap the corresponding stationary electrode pairs associated with the interior surface of the sensor housing, so as to generate an associated capacitance value.

Referring to FIG. 3, sensor housing 12 has an interior bore 12a for accommodating an impeller assembly 16. The impeller assembly 16, which is described in greater detail below in both form and function, is adapted and configured to receive fuel from an inlet conduit 17. As shown in FIGS. 2 and 10, the inlet conduit 17 extends through a central inlet bore 11e in mounting flange 14a. As shown in FIG. 10, an annular groove 11f is formed within the central inlet bore 11e of mounting flange 14a for accommodating a retaining ring 17a or a similar packing structure such as a lip seal or v-packing that cooperates with the outlet end of inlet conduit 17 to secure the position of the inlet conduit 17 relative to the impeller assembly 16, providing a fluid tight seal therebetween. Inlet conduit 17 is constructed and arranged to impart a helical flow pattern to the fluid passing into the impeller assembly 16. This adds angular velocity to the fluid flow, which in turn enhances the conversion of the fluid inertia into solid body rotation with respect to the impeller assembly 16. This is advantageous given the relatively small flow rate of the fluid that may be delivered to the impeller assembly during operation.

Figure 7:
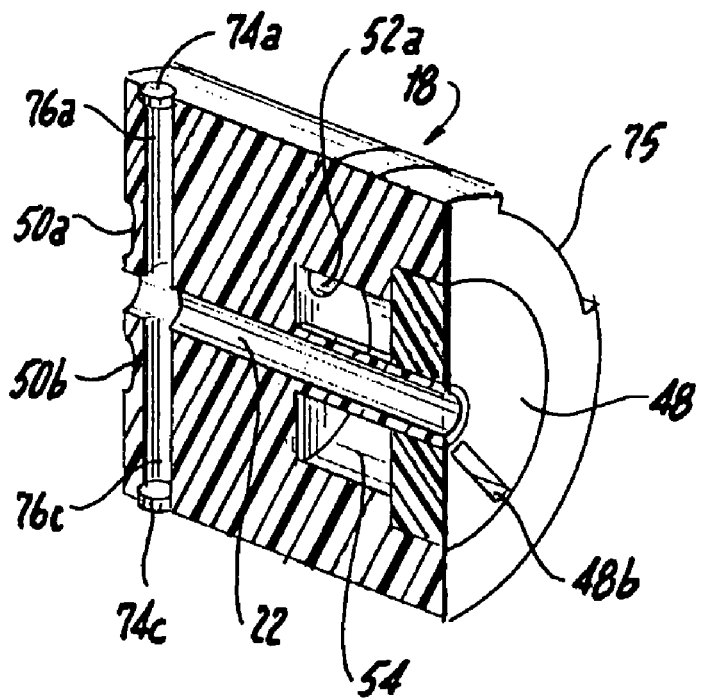
FIG. 7 is a cross-sectional view of the impeller body of the mass flow meter taken along line 7-7 of FIG. 5, illustrating features of the flow path through the impeller body and the shaped turbine outlet channels for converting fluid moment of momentum into solid body rotation.

Referring now to FIGS. 3-5, the impeller assembly 16 includes a cylindrical impeller body 18 supported within a cylindrical spacer sleeve 20. Spacer sleeve 20 is dimensioned and configured for accommodation within the interior bore 12a of sensor housing 12, and will be descried in greater detail below. The impeller body 18 is preferably supported for axial rotation within the spacer sleeve 20. More particularly, impeller body 18 includes an axial bore 22 (see FIG. 7) for accommodating an elongated spindle shaft 24. The spindle shaft 24 is preferably press fit into axial bore 22 and is supported by axially opposed low friction bearings 26a, 26b (see FIGS. 4 and 13). The low friction bearings 26a, 26b are preferably in the form of jewel bearings. However, it is envisioned that these bearings can also be in the form of ball bearings or the like.

Figure 13:
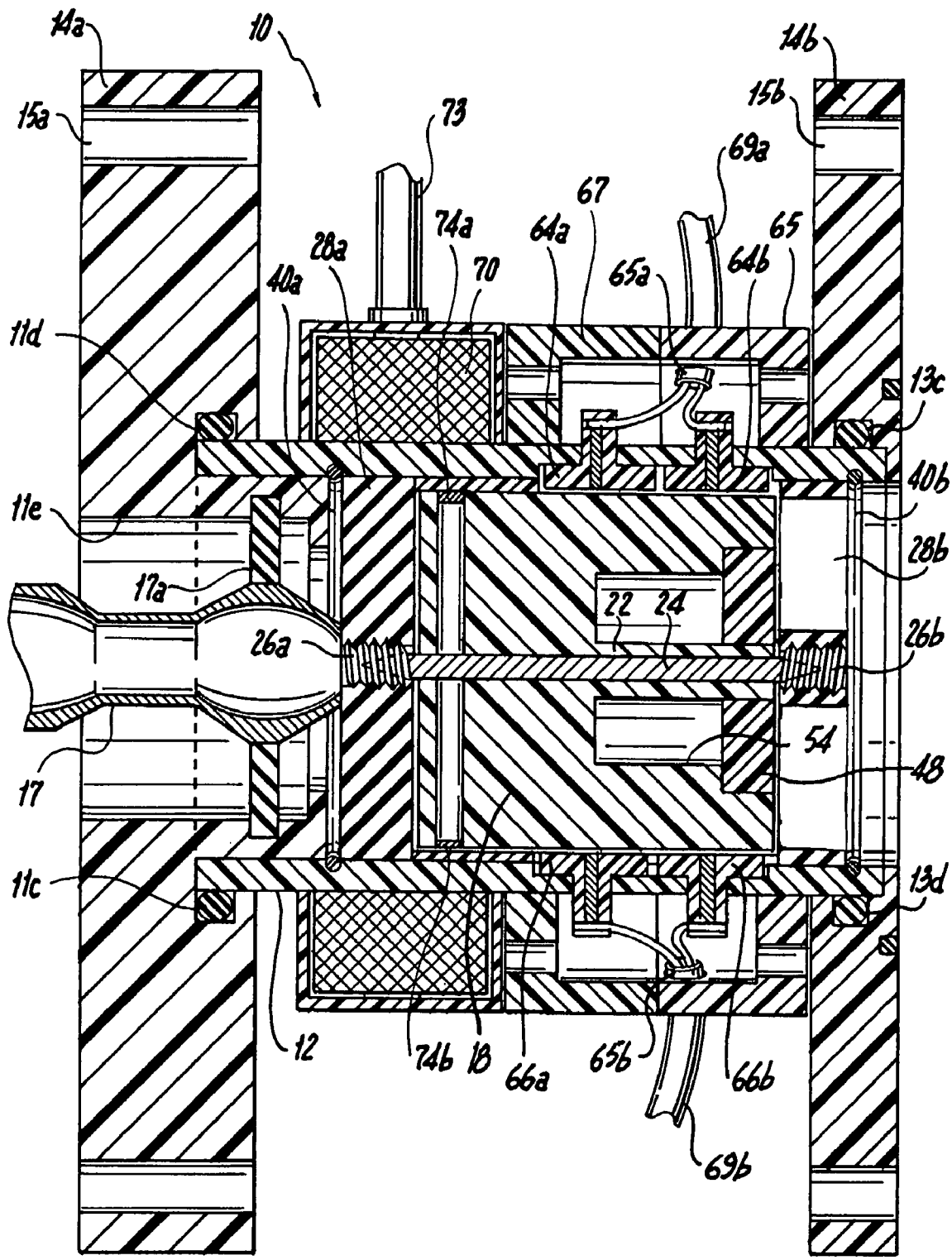
FIG. 13 is a side elevational view of the mass flow meter of the subject invention taken along line 12-12 of FIG. 1, similar to FIG. 12, with the impeller body shown in cross-section to reveal features of the interior fluid flow path that extends therethrough, together with the spindle shaft and jewel bearing that support the rotation of the impeller body.

The bearings 26a, 26b are preferably threadably retained in respective resilient support members 28a, 28b (see FIG. 13). The resilient support members 28a, 28b, described in greater detail below, are dimensioned and configured to facilitate axial adjustment of the threaded bearings 26a, 26b, and thus the axial pre-load applied to the spindle shaft 24 supporting the impeller body 18. This ensures that the impeller body 18 is axially restrained in an appropriate operative position within the sensor housing 12. In the alternative, it is envisioned that a spring arrangement may be used to preload spindle shaft 24 and retain the impeller body 18 in its operative position. A longitudinal slot 38 is provided in spacer sleeve 20 to gain access to the bearings, for example with a tool, for adjustment of the shaft loading.

Referring to FIGS. 3 and 4, support member 28a serves as the inlet end support member for the impeller assembly 16. Support member 28b serves as the outlet end support member for the impeller assembly 16. Support member 28a includes a hub section 30a for accommodating bearing 26a. The hub section 30a is retained by a medial web portion 32a. In addition, support member 28a includes diametrically opposed engagement tabs 34a that mate with corresponding reception notches 36a at the inlet side of spacer sleeve 20. This interaction serves to rotationally align and cooperatively lock the two structures 28a and 20 together.

Support member 28b includes hub section 30b for accommodating bearing 26b. The hub section 30b is retained by a medial web portion 32b. In addition, support member 28b includes diametrically opposed engagement tabs 34b that mate with corresponding reception slots 36b at the outlet side of spacer sleeve 20. This interaction rotationally aligns and locks the two structures 28b and 20 together. Thus, the two resilient support members 28a, 28b and the spacer sleeve 20 form an integral structure for accommodating the free rotation of the impeller body 18 about spindle shaft 24 within sensor housing 12.

With continuing reference to FIG. 3, opposed lock rings 40a, 40b axially secure the resilient supports 28a, 28b of impeller assembly 16 within the interior bore 12a of sensor housing 12 (see also FIG. 10). Lock rings 40a, 40b are seated within corresponding annular grooves 42a, 42b formed in the inner surface of interior bore 12a. The bearing supports 28a, 28b and spacer sleeve 20 are further secured against axial rotation within the interior bore 12a of sensor housing 12 through the interaction of the engagement tabs 34a of support 28a and the engagement tabs 34b of support 28b with a pair of diametrically opposed longitudinal slots 44a, 44b formed in the inner surface of the interior bore 12a of sensor housing 12. Thus, the two resilient support members 28a, 28b and the medial spacer sleeve 20 are maintained in a stationary position within the sensor housing 12, while the impeller body 18 is free to rotate about the spindle shaft 24 within the spacer sleeve 20, subject to certain mechanical and magnetic constraints, which will be discussed in greater detail below.

As best seen in FIG. 5, the impeller body 18 of impeller assembly 16 includes a turbine outlet plate 46 having angled slots 48a, 48b that are dimensioned and configured to convert the inertia imparted by the fluid flowing therethrough into solid body rotation or torque. It is envisioned that additional or alternative structures may be provided in or on the impeller body 18 to convert fluid inertia into torque, such as, for example, turning vanes or the like.

Figure 6:
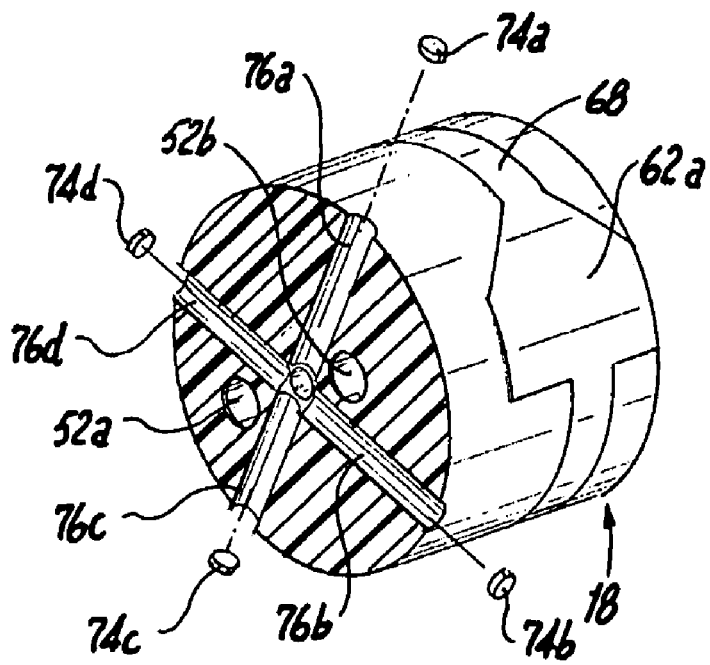
FIG. 6 is a cross-sectional view of the impeller body of the mass flow meter taken along line 6-6 of FIG. 5, illustrating the bores for receiving a plurality of permanent magnets.

Turbine outlet plate 46 is mounted in a recess 45 in the outlet face of impeller body 18. The slots 48a, 48b of outlet plate 46 communicate with a flow passage that extends through the impeller body 18. In particular, inlet troughs 50a, 50b are formed at the inlet end of the impeller body 18 (see FIG. 7). These inlet troughs feed axially extending turbine inlet flow channels 52a, 52b (see FIG. 6), which in turn feed a cylindrical spin chamber 54 (see FIG. 7). Spin chamber 54, also shown in FIG. 13, communicates directly with the angled slots 48a, 48b of turbine outlet plate 46.

As noted above, the impeller body 18 receives fuel from the inlet conduit 17 through the central inlet bore 11e in mounting flange 14a, as shown for example in FIG. 10. More particularly, the inlet conduit 17 communicates with the inlet troughs 50a, 50b of impeller body 18 through the bifurcated central opening in resilient support member 28a (see FIGS. 3 and 4). As explained above, inlet conduit 17 is designed as a flow swirler to produce a helical or vortex-like flow by imparting a component of angular velocity to the fluid entering the impeller body 18. In this regard, the flow swirler can be constructed from a thin walled tube or pipe, such as a pipe made from stainless steel or a similar material. The pipe preferably has an elliptical cross-section that is helically twisted about its longitudinal axis to produce the desired flow pattern.

Alternative swirl tube geometries and structures are envisioned as well. For example, the flow swirler defined here by inlet conduit 17 could include two helically arranged flow tubes that are entwined with one another to generate the desired flow pattern at a common or a conjoined exit. Or, the flow swirler could be configured as an annular fuel pipe with a helical path extending therethrough, as disclosed for example in U.S. Pat. No. 7,043,922, the disclosure of which is incorporated herein by reference.

Figure 11:
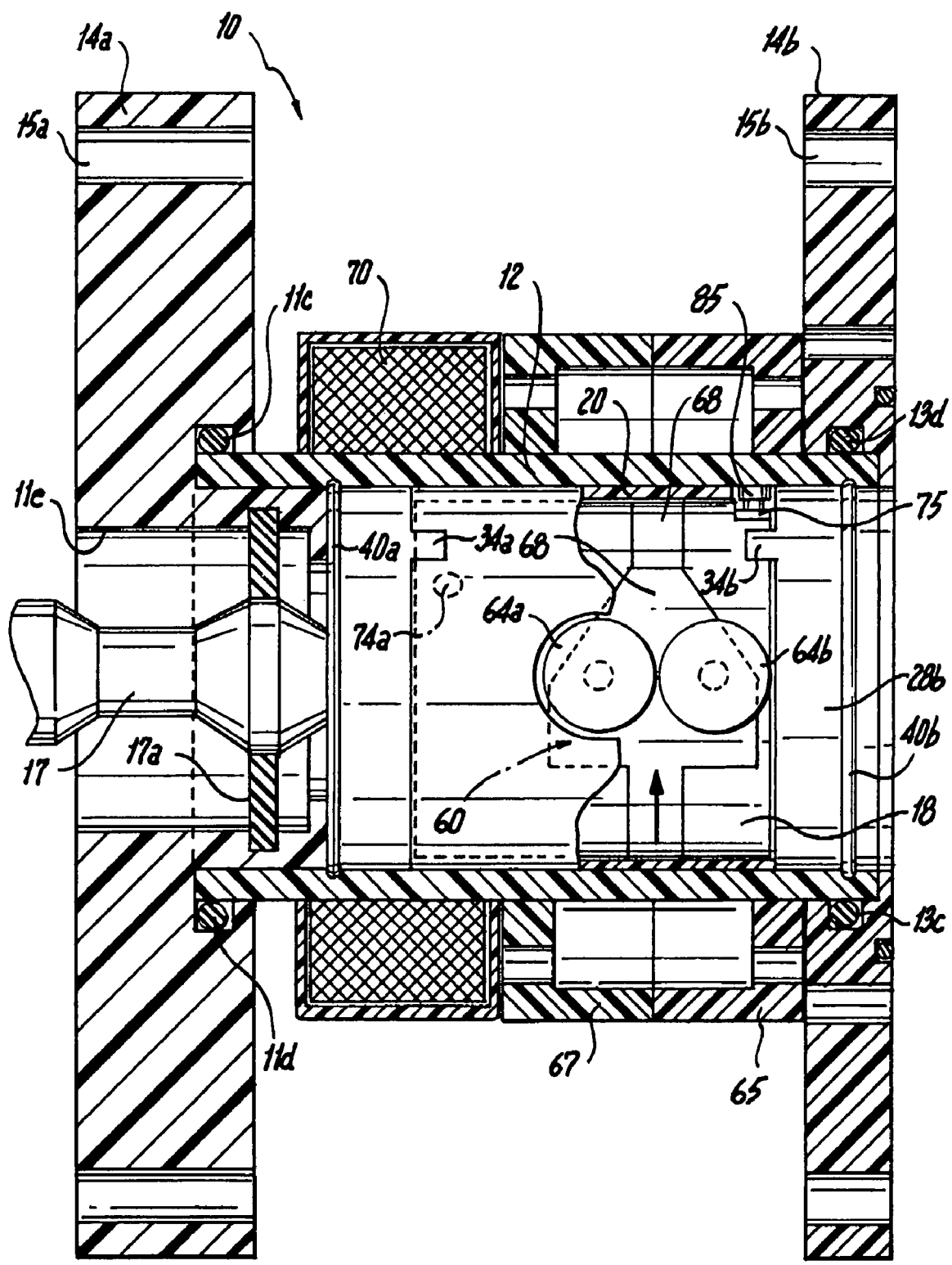
FIG. 11 is a side elevational view of the mass flow meter of the subject invention also taken along line 10-10 of FIG. 1, wherein the impeller body is rotationally advanced relative to the position shown in FIG. 10, so that the paired stationary electrodes associated with the interior surface of the sensor housing cover a larger portion of the conductive regions of the impeller body, resulting in an increased capacitance value relative to the capacitance value produced by interaction of the electrode pairs and conductive regions shown in FIG. 10.
Figure 12:
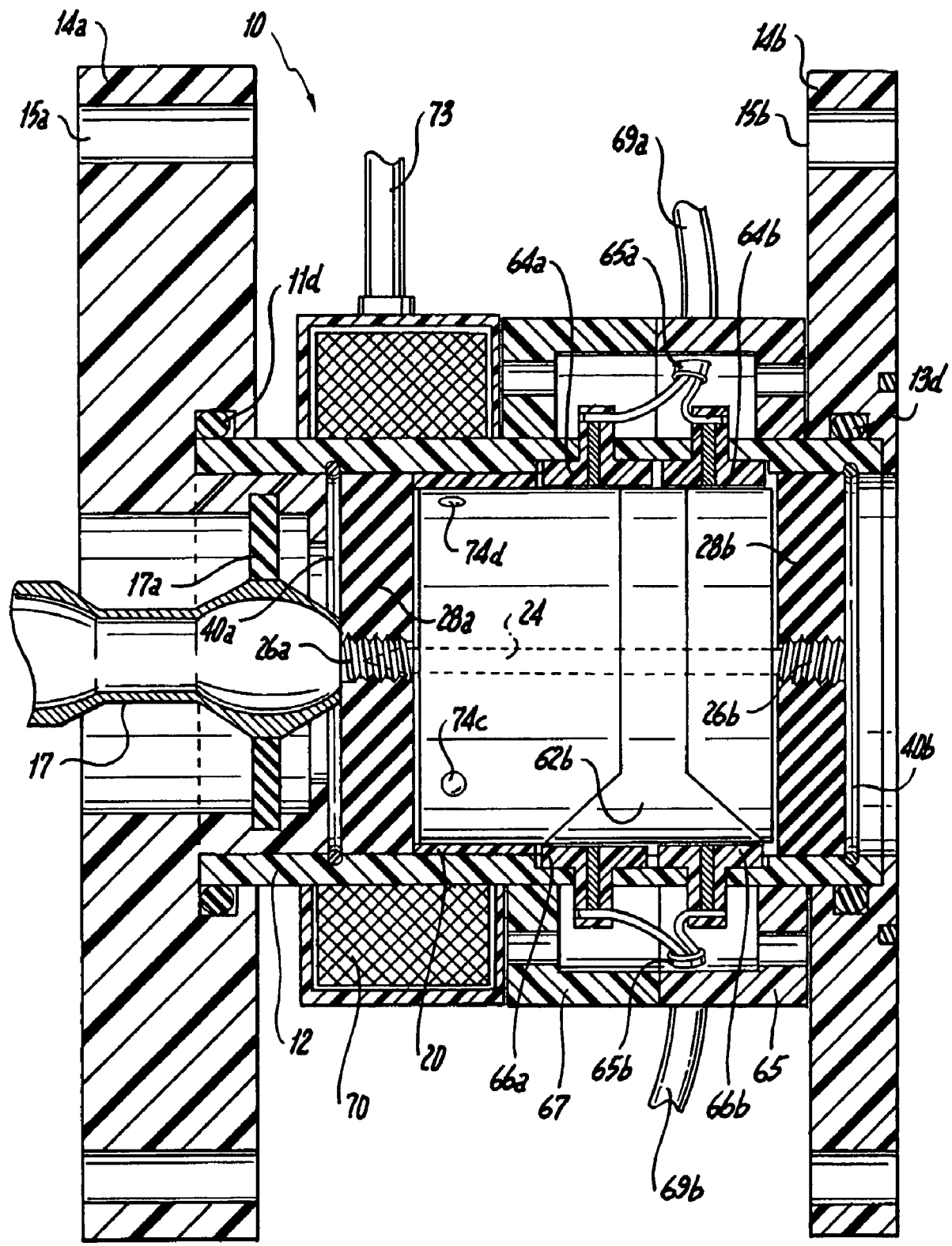
FIG. 12 is a side elevational view of the mass flow meter of the subject invention taken along line 12-12 of FIG. 1, with the wall of the sensor housing and impeller supports shown in cross-section to reveal the outer surface of the impeller body, and showing the electrical connections for the paired stationary electrodes.

With continuing reference to FIGS. 3-6 in conjunction with FIGS. 10-12, the mass flow meter 10 of the subject invention further includes a proximity sensor 60 (i.e., a transducer) for measuring a rotation angle of the impeller body 18 relative to the sensor housing 12 when fluid flows through the impeller body and induces a torque thereon. As explained in further detail below, the proximity sensor 60 is described and illustrated herein as a capacitive angular position sensor. However, it is envisioned and well within the scope of the subject disclosure that the proximity sensor 60 could also operate based on principles of electrical inductance or electromagnetically induced eddy currents, as would be readily understood by those skilled in the art to which the subject invention pertains.

The exemplary capacitive angular position sensor 60 described herein includes two diametrically opposed generally pentagonal shaped conductive regions 62a, 62b provided on an exterior surface of the impeller body 18. It should be apparent to those skilled in the art that the particular shape or geometry of the conductive regions of the angular position sensor can vary, so long as they are configured to produce a change in capacitance in response to rotation of the impeller body 18. The capacitive angular position sensor 60 further includes two corresponding pairs of diametrically opposed pick-off electrodes 64a, 64b and 66a, 66b associated with or otherwise embedded in the inner surface of the interior bore 12a of sensor housing 12 for electrically interacting with the conductive regions.

In the magnetically balanced condition, shown for example in FIG. 10, each pair of pick-off electrodes 64a, 64b and 66a, 66b is positioned to partially overlap a corresponding conductive region 62a, 62b. Preferably, the two diametrically opposed conductive regions 62a, 62b are formed by a conductive film or foil. The two regions are conductively joined by a continuous circumferential band 68, which is also formed from an electrically conductive film or foil. Unobstructed capacitive communication between the pick-off electrodes 64a, 64b and corresponding conductive region 62a is effectuated through an elongated opening 25a in spacer sleeve 20, best seen in FIG. 5. Similarly, unobstructed capacitive communication between the pick-off electrodes 66a, 66b and corresponding conductive region 62b is effectuated through an elongated opening 25b in spacer sleeve 20.

With further reference to FIG. 3 in conjunction with FIGS. 12 and 13, the pick-off electrodes 64a, 64b and 66a, 66b of capacitive angular position sensor 60 are surrounded and enclosed by a pair of two-part annular covers 65 and 67. Annular cover 65 includes two apertures 65a, 65b, which accommodate the electrical wiring associated with pick-off electrodes 64a, 64b and 66a, 66b. In particular, an upper cable 69a extends though aperture 65a and is operatively associated with pick-off electrodes 64a, 64b. Similarly, a lower cable 69b extends through aperture 65b and is operatively associated with pick-off electrodes 66a, 66b. Those skilled in the art will readily appreciate that alternative wiring provision can be provided. For example, separate wires can be associated with each individual electrode. It is also envisioned that covers 65 and 67 could house or otherwise include on-board electronics configured to perform the mathematical conversion of capacitance values to voltage values, in close proximity to the pick-off electrodes 64a, 64b and 66a, 66b.

The mass flow meter 10 of the subject invention further includes an electromagnetic assembly or force-balanced motor adapted to prevent flow induced rotation or torque of the impeller body 18 (i.e., to keep the impeller body 18 in a constant angular position with respect to the sensor housing 12 when torque is applied to the impeller body). As shown in FIG. 11, the electromagnetic assembly or motor includes an annular stator coil 70 located adjacent to annular cover 65. Stator coil 70 receives power through a cable 73 and is adapted to generate a magnetic field around the sensor housing 12. The magnetic field operates with respect to a plurality of permanent magnets 74a-74d positioned in the impeller body 18, in a manner best seen in FIG. 6. In particular, each magnet 74a-74d is positioned within a respective bore 76a-76d formed in the impeller body 18. The magnets 74a-74d are circumferentially spaced 90° apart from one another about the periphery of impeller body 18.

As explained in more detail below, when fluid is not flowing through flow meter 10, the impeller body 18 seeks a magnetically balanced center position within the spacer sleeve 20. This position is based upon the current flowing to the stator coil 70 as it relates to the capacitance value derived from the amount of the overlap that exists between the conductive regions 62a, 62b and the pick-off electrode pairs 64a, 64b and 66a, 66b.

In order to prevent the impeller body 18 from deviating axially from its home position and possibly finding a new home position at the next 90° quadrant, as it seeks its magnetically balanced center position, and to avoid finding a new home in a another quadrant, flow meter 10 is provided with a rotation limiter pin 85. Limiter pin 85 extends radially into the bore 12a of sensor housing 12, and through an arcuate groove 75 in sleeve 20, to register with an arcuate slot 72 formed in the leading edge of the impeller body 18, as best seen in FIGS. 3-6 and 10. The registration slot 72 has an arc length of about 20° to 30° and preferably extends between two adjacent permanent magnets. The arcuate extent of slot 72 prevents the impeller body 18 from seeking the wrong home position under the influence of the magnets, which would prevent the impeller body from achieving rotational stability.

Figure 8:
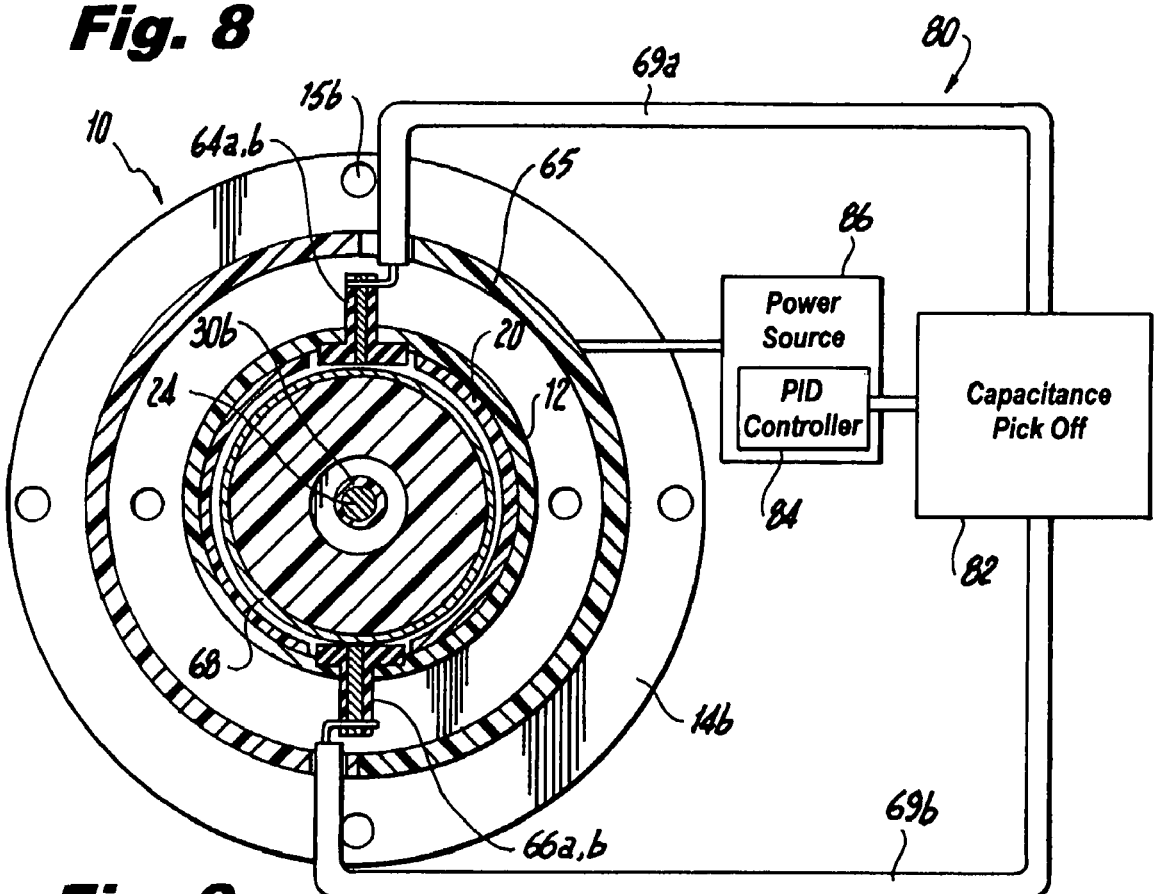
FIG. 8 is a cross-sectional view of the mass flow meter of the subject invention taken along line 8-8 of FIG. 1 and shown in conjunction with a schematic diagram of the feedback control loop associated therewith, which includes capacitive pick-off electronics associated with the stationary electrodes, and a controller for controlling the current delivered to the electromagnet surrounding the sensor housing in proportion to flow induced torque applied to the impeller body.
Figure 9:
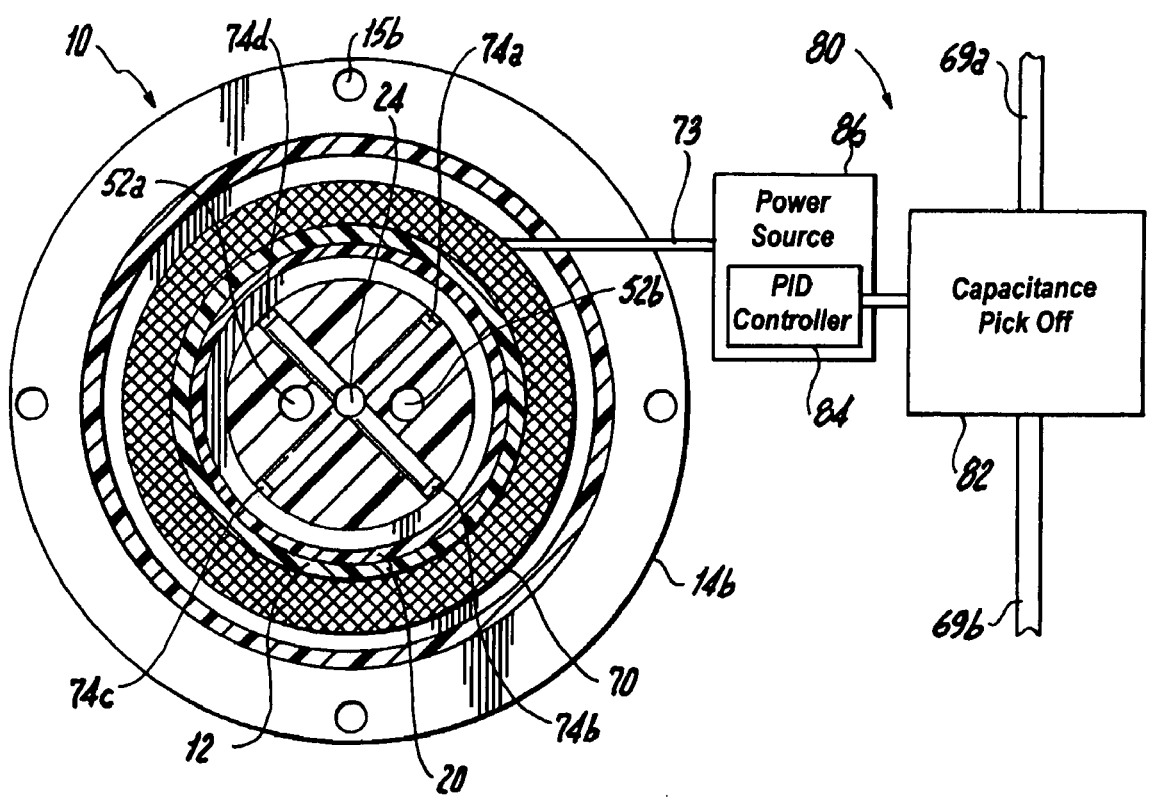
FIG. 9 is a cross-sectional view of the mass flow meter of the subject invention taken along line 9-9 of FIG. 1 and shown in conjunction with a schematic diagram of the feedback control loop associated therewith.

As shown schematically in FIGS. 8 and 9, the mass flow meter 10 of the subject invention also includes a feed back control system 80, which cooperates with the capacitive angular position sensor 60 and stator coil 70. The control system 80 includes capacitance pick-off electronics 82 for determining electrical values (e.g., capacitance) from the pick-off electrode pairs 64a, 64b and 66a, 66b.

More particularly, when the impeller body 18 is in a magnetically balanced condition shown for example in FIG. 10, and about 40% of the surface area of the paired pick-off electrodes 64a, 64b is coincident with conductive region 62a. There is a certain capacitance value associated with this condition. While not shown in FIG. 10, at such a time, pick-off electrodes 66a, 66b are overlapping an equal area of conductive region 62b to produce the resulting capacitance value (see FIG. 12).

In contrast, as shown in FIG. 11 for exemplary purposes only, when flow-induced torque is applied to impeller body 18, causing it to rotate about spindle shaft 24, about 80% of the surface area of the paired pick-off electrodes 64a, 64b is coincident with conductive region 62a. Those skilled in the art will readily appreciate that there is an increased capacitance value associated with this interaction, as compared to the position shown in FIG. 10. Again, while not shown in FIG. 11, at such a time, pick-off electrodes 66a, 66b are overlapping an equal area of conductive region 62b to produce the increased capacitance value.

Referring to FIGS. 8 and 9, the control system 80 of mass flow meter 10 also includes a proportional-integral-derivative controller (PID controller) 84 connected to an associated amplifier (not shown) and a power source 86. The PID controller 84 controls the amount of electricity (e.g., current or voltage) supplied to the stator coil 70 in response to changes in the capacitance values detected by the pick-off electronics 82. For example, PID controller 84 would increase the amount of current supplied to stator coil 70 in response to the increase in capacitance value detected by the pick-off electronics 82 resulting from the torque induced rotation of impeller body 18 from the magnetically balanced position shown in FIG. 10 to the position shown in FIG. 11.

In operation, based upon the amount of current received thereby, stator coil 70 generates a magnetic field relative to the permanent magnets 74a-74d. The magnetic field is sufficient to prevent the impeller body 18 from rotating within sensor housing 12, despite the fluid induced torque being applied thereto. More particularly, the PID controller 84 takes a measured value from the capacitance pick-off electronics 82 and compares it with a reference setpoint value to determine the "error" proportional to the capacitance difference. The difference (or "error" signal) is then used to adjust the electrical input (e.g., DC-current) to the stator coil 70 to generate the magnetic field in order to bring the measured value to its desired setpoint. The DC-current value varies to bring the measured capacitor values (impeller rotation angle) back to its desired setpoint, e.g., the magnetically balanced position of FIG. 10.

Hence, the induced magnetic forces interact with the magnets 74a-74d, counterbalancing flow induced torque and, therefore, preventing impeller body 18 from rotating. In accordance with the subject invention, the DC-current supplied to stator coil 70 is proportional to the measured flow-induced torque (which is a product of the mass flow rate and volumetric flow rate). Therefore, the output of the capacitive angular position sensor 60 is a signal that is proportional to the DC-current supplied to the stator coil 70.

Those skilled in the art will readily appreciate that unlike simpler controllers, the PID controller can adjust process outputs based on the history and rate of change of the error signal, which gives more accurate and stable control. It should also be appreciated that if the mass flow meter of the subject invention is employed in conjunction with a volumetric flow meter, the output derived therefrom can be used to compute fuel mass flow rate or fuel density.

Figure 14:
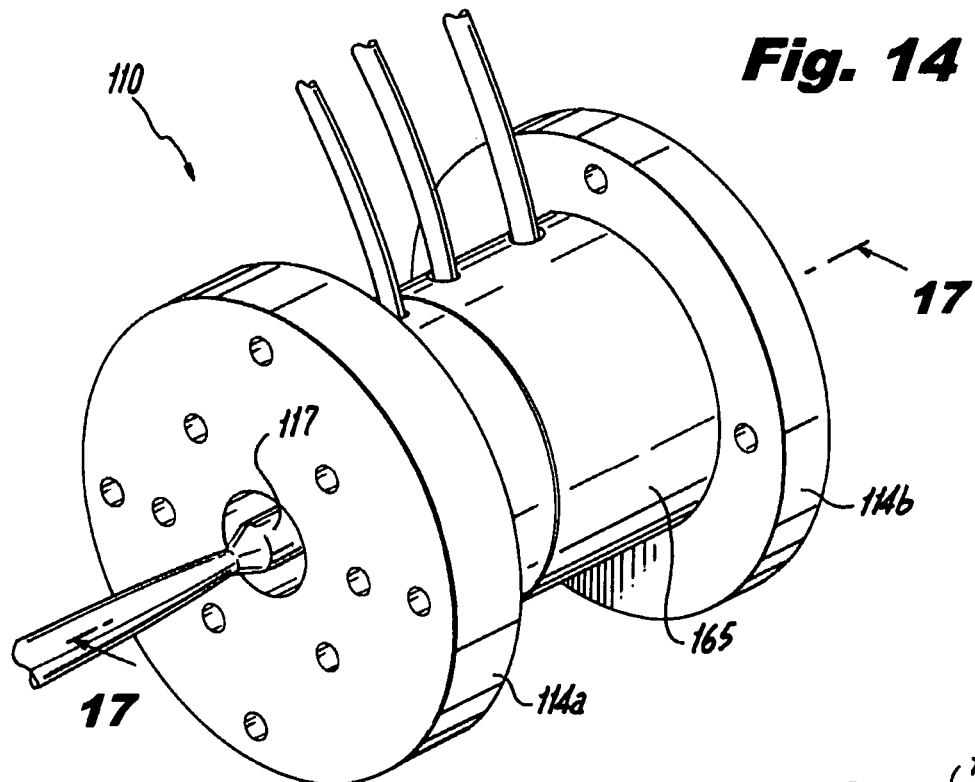
FIG. 14 is a perspective view of another mass flow meter of the subject invention, shown with a flow swirler for imparting a helical flow to fluid entering the device.
Figure 15:
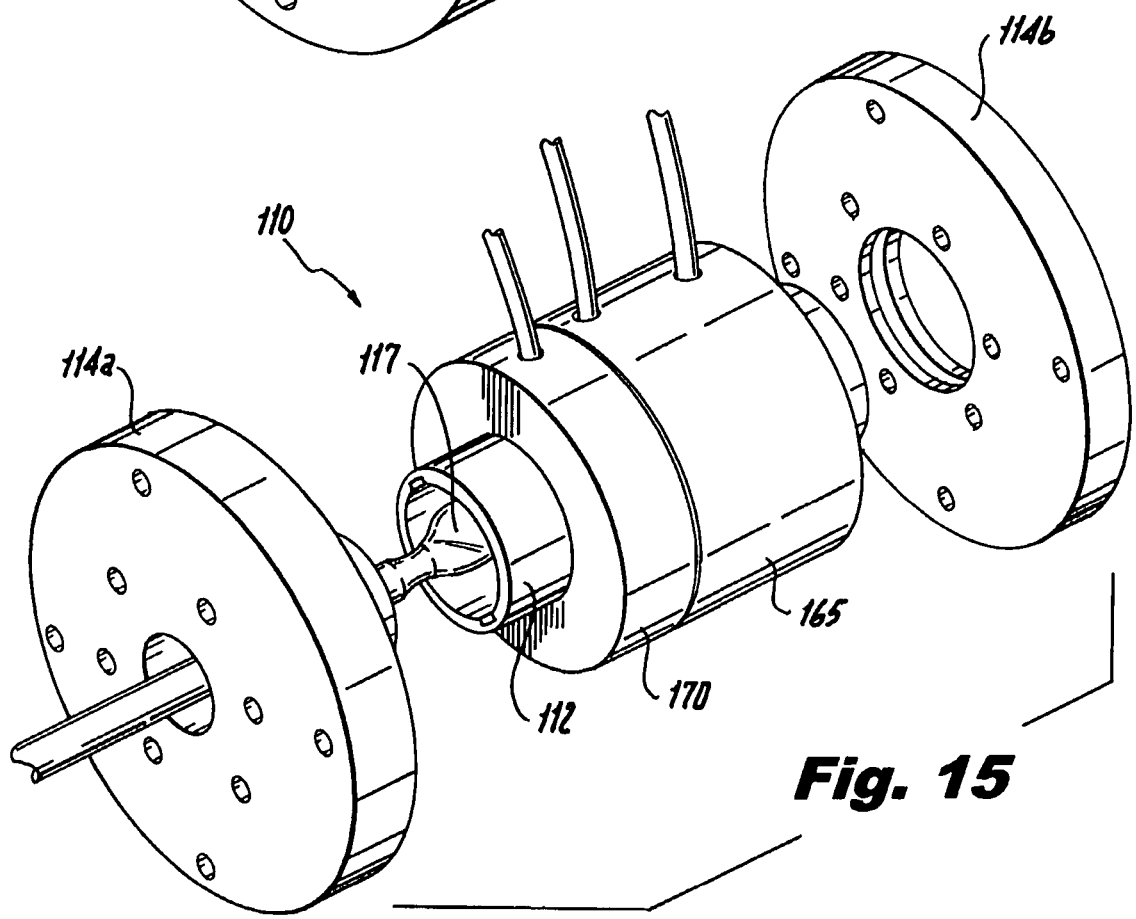
FIG. 15 is a perspective view of the mass flow meter shown in FIG. 14, with the axially opposed mounting flanges associated therewith removed for ease of illustration.

Referring now to FIGS. 14-18, there is illustrated another mass flow meter constructed in accordance with a preferred embodiment of the subject invention and designated generally by reference numeral 110. Mass flow meter 110 is similar to mass flow meter 10 in principle. However, the capacitive angular position sensor of the device differs from that which is included in flow meter 10, as will be explained in greater detail below. Referring to FIGS. 14 and 15, mass flow meter 110 includes a sensor housing 112 bounded by mounting flanges 114a, 114b, which receives fuel from an inlet flow conduit 117. Sensor housing 112 and mounting flanges 114a, 114b are assembled in the fluid tight manner described above with respect to mass flow meter 10.

Figure 16:
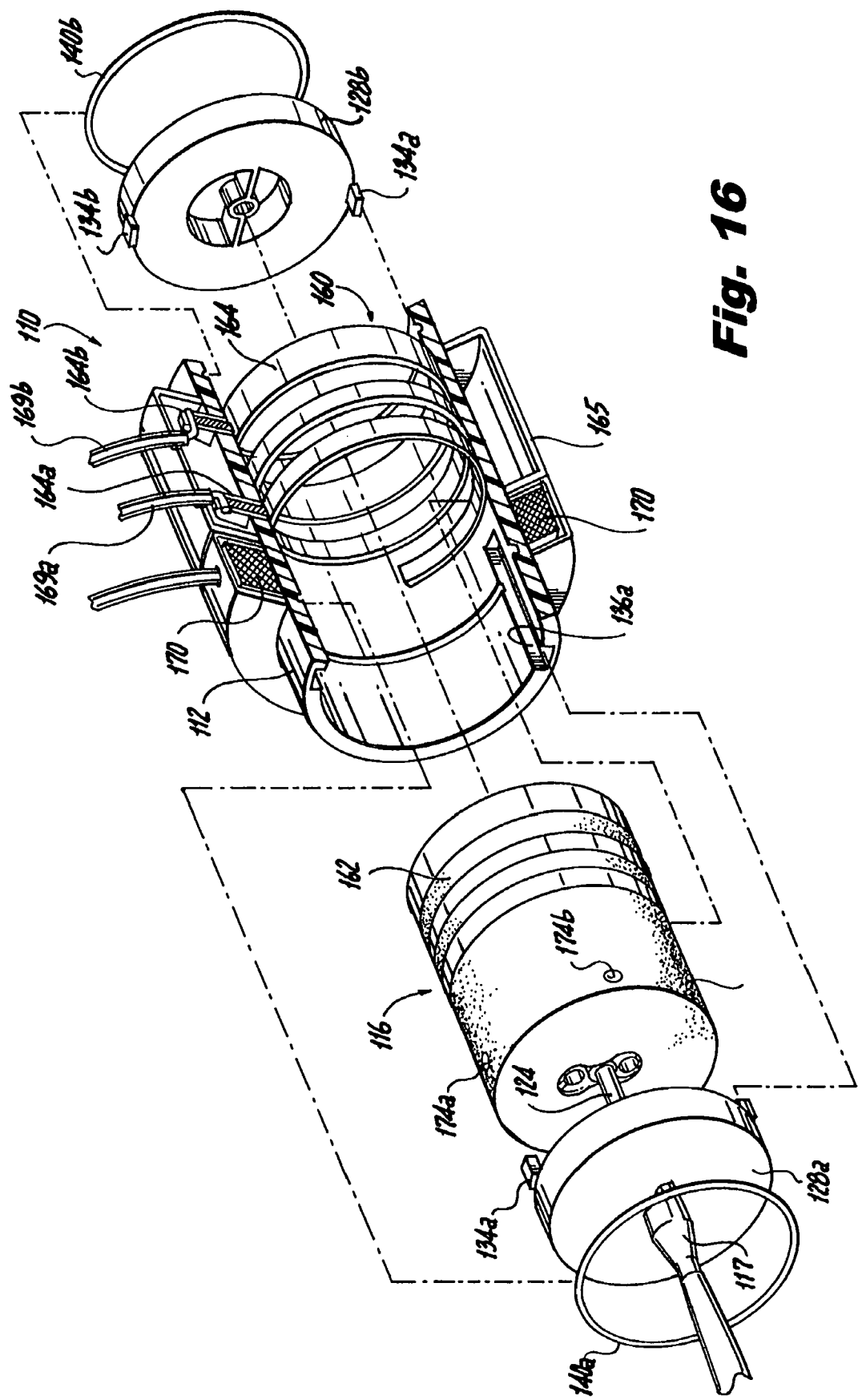
FIG. 16 is an exploded perspective view of the mass flow meter of FIG. 14, as viewed from the inlet end, with the impeller assembly separated from the sensor housing to illustrate the helical conductive region provided on an exterior surface of the impeller body and a helical stationary electrode associated with an interior surface of the sensor housing, which is connected to capacitor output pins or terminals.

Referring to FIG. 16, mass flow meter 110 further includes an impeller assembly 116 that includes an impeller body 118 supported for axial rotation about a spindle shaft 124 and mounted between two resilient support members 128a, 128b. Support members 128a, 128b are dimensioned and configured to threadably retain low-friction bearings 126a, 126b, which support the rotation of spindle shaft 124 (see FIG. 17). Support members 128a, 128b are axially retained within sensor housing 112 by lock rings 140a, 140b, and they are inhibited from rotating within sensor housing 112 through the interaction of engagement tabs 134a with slots 136a, and tabs 134b with slots 136b (see FIG. 17).

Referring to FIG. 16, as previously noted, the capacitive angular position sensor 160 of mass flow meter 110 differs from the position sensor 60 of flow meter 10. In this regard, position sensor 160 includes a stationary helically arranged electrode 164 disposed on the interior surface of the inner bore 112a of sensor housing 112. The stationary helical electrode 164 is electrically connected to terminal posts 164a, 164b, which are enclosed by an annular cover 165 that surrounds sensor housing 112. The terminals 164a, 164b are operatively connected by conductive cables 167a, 167b to the pick-off electronics of a feed back control system in a manner as shown in FIGS. 8 and 9. The capacitive angular position sensor 160 further includes a helically arranged conductive region 162 disposed on the outer surface of impeller body 118, which is adapted and configured to interact with the stationary helical electrode 164.

Figure 17:
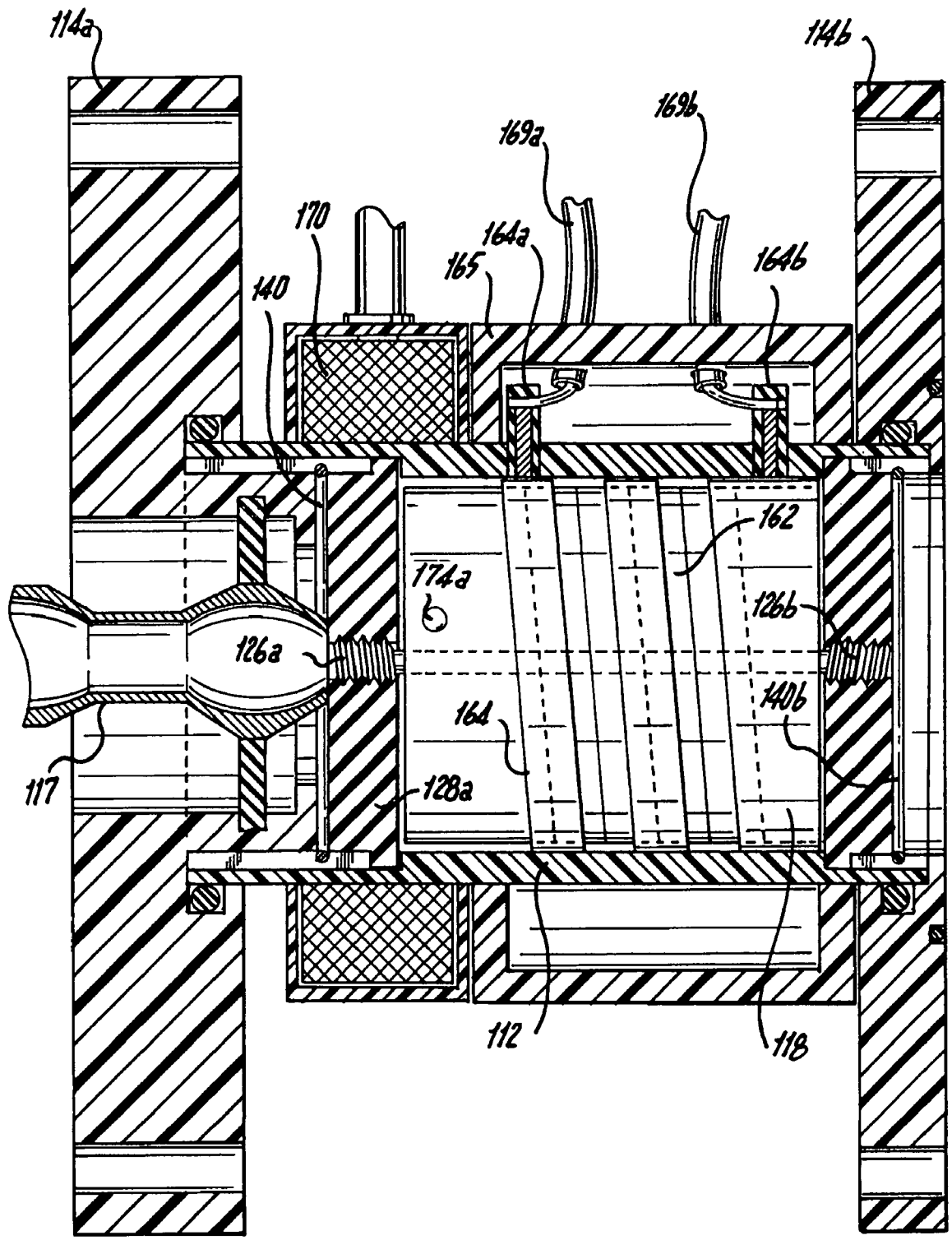
FIG. 17 is side elevational view of the mass flow meter of FIG. 14 with the sensor housing shown in cross-section to reveal the impeller body, which is disposed in a magnetically balanced home position with the stationary electrode helix on the an interior surface of the sensor housing and the helical conductive region on the impeller body partially overlapping, resulting in a certain capacitance value.
Figure 18:
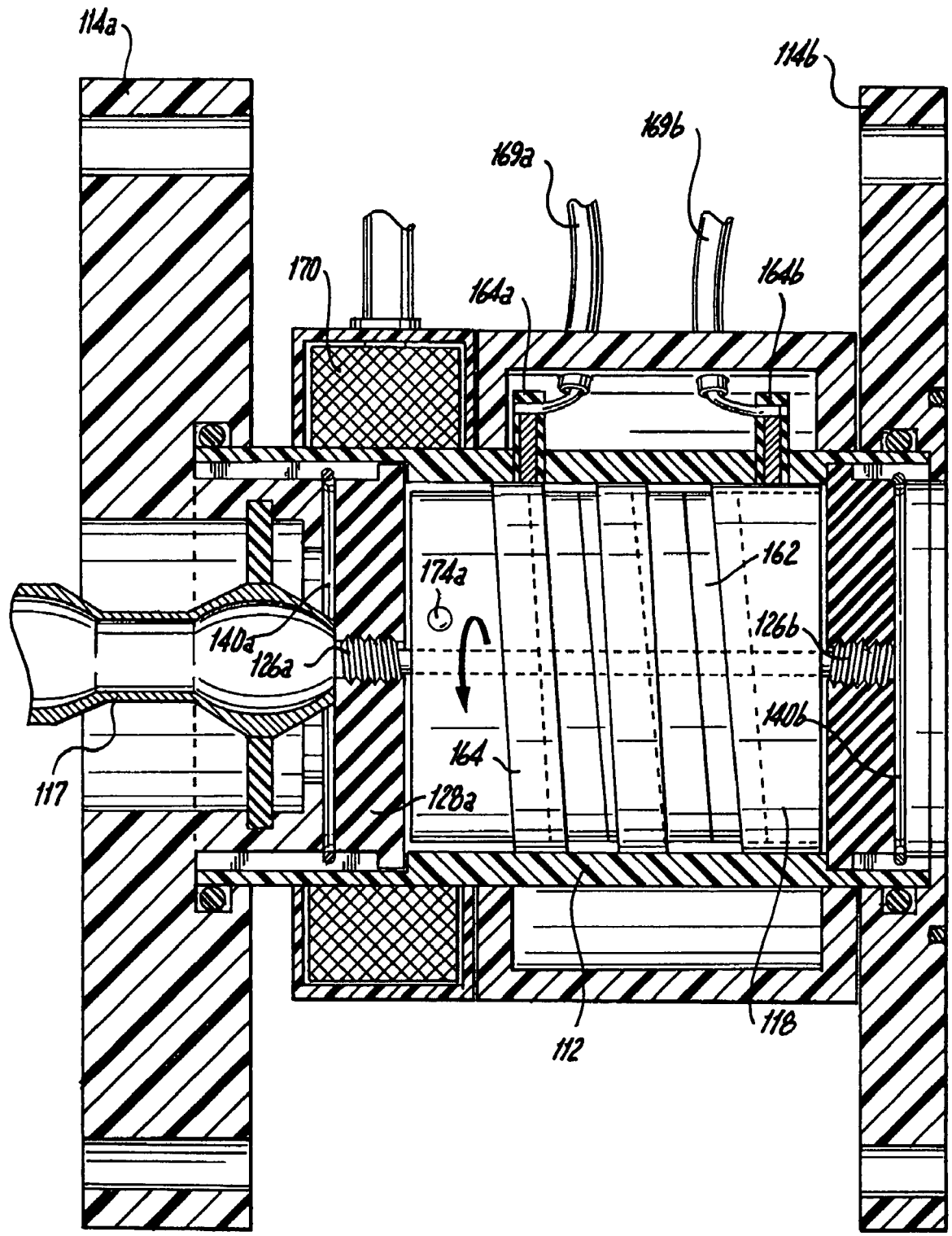
FIG. 18 is side elevational view of the mass flow meter of FIG. 17 with the sensor housing shown in cross-section to reveal the impeller body, which is disposed in a rotationally advanced position relative to the home position of FIG. 17, and wherein there is less overlap between the stationary electrode helix on the interior surface of the sensor housing and the helical conductive region on the impeller body than shown in FIG. 17, which results in an different capacitance value relative to the interaction shown in FIG. 17.

In use, when the impeller body 118 is subjected to flow induced torque it will move between the steady-state magnetically balanced home position of FIG. 17 to the axially rotated position of FIG. 18. When the impeller body 118 is in the magnetically balanced position of FIG. 17, there is partial overlap between the helically arranged stationary electrode 164 and the helical conductive region 162. Those skilled in the art will readily appreciate that there is a certain capacitance value associated with this interaction. In the axially rotated position of FIG. 18, there is less overlap between the helically arranged stationary electrode 164 and the helical conductive region 162, relative to the magnetically balanced home position of FIG. 17. Those skilled in the art will readily appreciate that there is a different capacitance value associated with this interaction.

In accordance with the subject invention, the change in the capacitance value described above results in a change in the current delivered to stator coil 170, by way of a PID controller. The change in the power delivered to stator coil 170 causes a corresponding change in the magnetic field associated with the four circumferentially disposed permanent magnets imbedded in impeller body 118. Two of the four magnets 174a, 174b are shown. This magnetic field acts to return the impeller body 118 to or otherwise maintain it in the magnetically balanced home position of FIG. 17.

As noted above with respect to mass flow meter 10, the PID controller takes a measured value from the capacitance pick-off electronics associated with angular position sensor 160 and compares it with a reference setpoint value to determine the "error" proportional to the capacitance difference. The difference (or "error" signal) is then used to adjust the electrical input (e.g., DC-current) to the stator coil 170 to generate the magnetic field in order to bring the measured value to its desired setpoint. The DC-current value varies to bring the measured capacitor values (impeller rotation angle) back to its desired setpoint, e.g., the magnetically balanced position of FIG. 17.

Hence, the induced magnetic forces interact with the magnets 174a-174d, counterbalancing flow induced torque and, therefore, preventing impeller body 118 from rotating. In accordance with the subject invention, the DC-current supplied to the stator coil 170 is proportional to the measured flow-induced torque (which is a product of the mass flow rate and volumetric flow rate). Therefore, the output of the capacitive angular position sensor 160 is a signal proportional to the DC-current supplied to the stator coil 170.

While the apparatus of the subject invention has been shown and described with reference to preferred embodiments, those skilled in the art will readily appreciate that various changes and/or modifications may be made thereto without departing from the spirit and scope of the subject invention as defined by the appended claims.

What is claimed is:

1. A force balanced mass flow meter comprising:
a) a cylindrical sensor housing having an interior bore;
b) an impeller body supported for axial rotation within the interior bore of the sensor housing and including means for converting fluid inertia into flow induced torque when fluid flows relative to the impeller body;
c) sensing means locationally associated with an exterior surface of the impeller body and an interior surface of the interior bore of the sensor housing for measuring a rotation angle of the impeller body relative to the sensor housing;
d) electromagnetic means for generating a magnetic field about the impeller body that maintains the impeller body in a constant angular position with respect to the sensor housing when torque is applied to the impeller body;
e) means for determining electrical values from the sensing means when fluid flows relative to the impeller body; and
f) means for controlling electricity supplied to the electromagnetic means in response to electrical values determined from the sensing means, to generate a magnetic field sufficient to prevent rotation of the impeller body.

2. A force balanced mass flow meter as recited in claim 1, wherein the means for converting fluid inertia into flow induced torque includes a fluid flow path extending through the impeller body.

3. A force balanced mass flow meter as recited in claim 2, wherein the fluid flow path includes shaped turbine outlet channels.

4. A force balanced mass flow meter as recited in claim 2, further comprising a non-rotating tubular flow swirler aligned with the impeller body and communicating with an inlet end of the fluid flow path.

5. A force balanced mass flow meter as recited in claim 4, wherein the flow swirler comprises a pipe having an elliptical cross-section, helically twisted about a longitudinal axis thereof.

6. A force balanced mass flow meter as recited in claim 1, wherein the impeller body is supported for axial rotation about an elongated shaft.

7. A force balanced mass flow meter as recited in claim 6, wherein the shaft is supported by axially opposed bearings.

8. A force balanced mass flow meter as recited in claim 7, wherein the axially opposed bearings are retained by axially opposed resilient supports coupled to the sensor housing.

9. A force balanced mass flow meter as recited in claim 8, wherein the resilient supports are further coupled to a spacer sleeve, within which the impeller body is free to rotate about the shaft.

10. A force balanced mass flow meter as recited in claim 8, wherein the axially opposed bearings are adjustable to pre-load the shaft.

11. A force balanced mass flow meter as recited in claim 1, wherein the sensing means comprises a proximity sensor.

12. A force balanced mass flow meter as recited in claim 1, wherein the sensing means comprises a capacitive angular position sensor.

13. A force balanced mass flow meter as recited in claim 12, wherein the capacitive angular position sensor includes two diametrically opposed conductive regions provided on an exterior surface of the impeller body and two corresponding pairs of diametrically opposed electrodes associated with an interior surface of the sensor housing.

14. A force balanced mass flow meter as recited in claim 13, wherein the two diametrically opposed conductive regions provided on the outer surface of the impeller body include regions of a conductive film.

15. A force balanced mass flow meter as recited in claim 12, wherein the capacitive angular position sensor includes a helical conductive region provided on an exterior surface of the impeller body and a helical electrode associated with an interior surface of the sensor housing.

16. A force balanced mass flow meter as recited in claim 1, wherein the electromagnetic means includes a plurality of permanent magnets positioned in the impeller body about a circumference thereof, and a stator coil surrounding the sensor housing aligned with the permanent magnets.

17. A force balanced mass flow meter as recited in claim 1, wherein the means for determining electrical values from the sensing means comprises capacitance pick-off electronics.

18. A force balanced mass flow meter as recited in claim 1, wherein the means for controlling the electricity supplied to the electromagnetic means comprises a proportional-integral-derivative controller.

19. A force balanced mass flow meter as recited in claim 18, wherein the proportional-integral-derivative controller is connected to a power amplifier.

20. A force balanced mass flow meter as recited in claim 1, wherein the current supplied to the electromagnetic means is proportional to flow induced torque applied to the impeller body.

21. A force balanced mass flow meter comprising:
a) a cylindrical sensor housing having an interior bore;
b) an impeller body supported for axial rotation within the interior bore of the sensor housing, the impeller body having a fluid flow path extending therethrough configured to generate flow induced torque with respect to the impeller body;
c) a capacitive angular position sensor locationally associated with an exterior surface of the impeller body and an interior surface of the interior bore of the sensor housing for measuring a rotation angle of the impeller body relative to the sensor housing;

d) a plurality of permanent magnets positioned in the impeller body about a circumference thereof;

e) a stator surrounding the sensor housing aligned with the permanent magnets for generating a magnetic field to prevent rotation of the impeller body;

f) capacitance pick-off electronics for determining capacitance values from the capacitive angular position sensor when fluid flows through the impeller body; and g) a proportional-integral-derivative controller for controlling current supplied to the stator in response to capacitance values from the sensing means, to generate a magnetic field sufficient to prevent impeller rotation, wherein the current supplied to the stator is proportional to flow induced torque applied to the impeller body.

22. A force balanced mass flow meter as recited in claim 21, wherein the fluid flow path includes shaped turbine outlet channels.

23. A force balanced mass flow meter as recited in claim 21, further comprising an elongated flow swirler communicating with an inlet end of the fluid flow path extending through the impeller body.

24. A force balanced mass flow meter as recited in claim 23, wherein the flow swirler is configured to impart a helical flow to fluid passing therethrough.

25. A force balanced mass flow meter as recited in claim 24, wherein the flow swirler comprises a pipe having an elliptical cross-section, helically twisted about its longitudinal axis.

26. A force balanced mass flow meter as recited in claim 21, wherein the impeller body is supported for axial rotation about an elongated shaft supported by axially opposed bearings.

27. A force balanced mass flow meter as recited in claim 26, wherein the axially opposed bearings are held by resilient supports linked to the sensor housing and providing preload to the shaft.

28. A force balanced mass flow meter as recited in claim 27, wherein the resilient supports are further coupled to a spacer sleeve, within which the impeller body is free to rotate about the shaft.

29. A force balanced mass flow meter as recited in claim 21, wherein the capacitive angular position sensor includes two diametrically opposed conductive regions provided on an exterior surface of the impeller body and two corresponding pairs of diametrically opposed electrodes associated with an interior surface of the sensor housing.

30. A force balanced mass flow meter as recited in claim 29, wherein the two diametrically opposed conductive regions provided on the outer surface of the impeller body include regions of a conductive film.

31. A force balanced mass flow meter as recited in claim 21, wherein the capacitive angular position sensor includes a helical conductive region provided on an exterior surface of the impeller body and a stationary helical electrode associated with an interior surface of the sensor housing.

32. A force balanced mass flow meter as recited in claim 21, wherein the proportional-integral-derivative controller is connected to a power amplifier.

33. A force balanced mass flow meter comprising:
a) fixed non-rotating tubular swirler configured to convert an incoming fluid flow into an outgoing helical swirl flow;
b) a freely rotatable flow induced torque measuring assembly communicating with the tubular swirler and configured to measure a torque value of the helical swirl flow generated by the tubular swirler; and
c) a closed loop control based electromagnetic system configured to generate electromagnetic forces that prevent the flow induced torque measuring assembly from rotating under the influence of the helical swirl flow.

34. A force balanced mass flow meter as recited in claim 33, wherein an output is provided by the mass flow meter in the form of DC current, and wherein current value is proportional to a product of mass flow rate and volumetric flow rate.

* * * * *